June 5, 1951     J. F. FISHTER     2,555,638
TRIPOD HEAD

Filed Sept. 29, 1948     2 Sheets-Sheet 1

Inventor
JACOB FRANZ FISHTER
By Stuart M. Mau
Attorney

June 5, 1951  J. F. FISHTER  2,555,638
TRIPOD HEAD
Filed Sept. 29, 1948  2 Sheets-Sheet 2
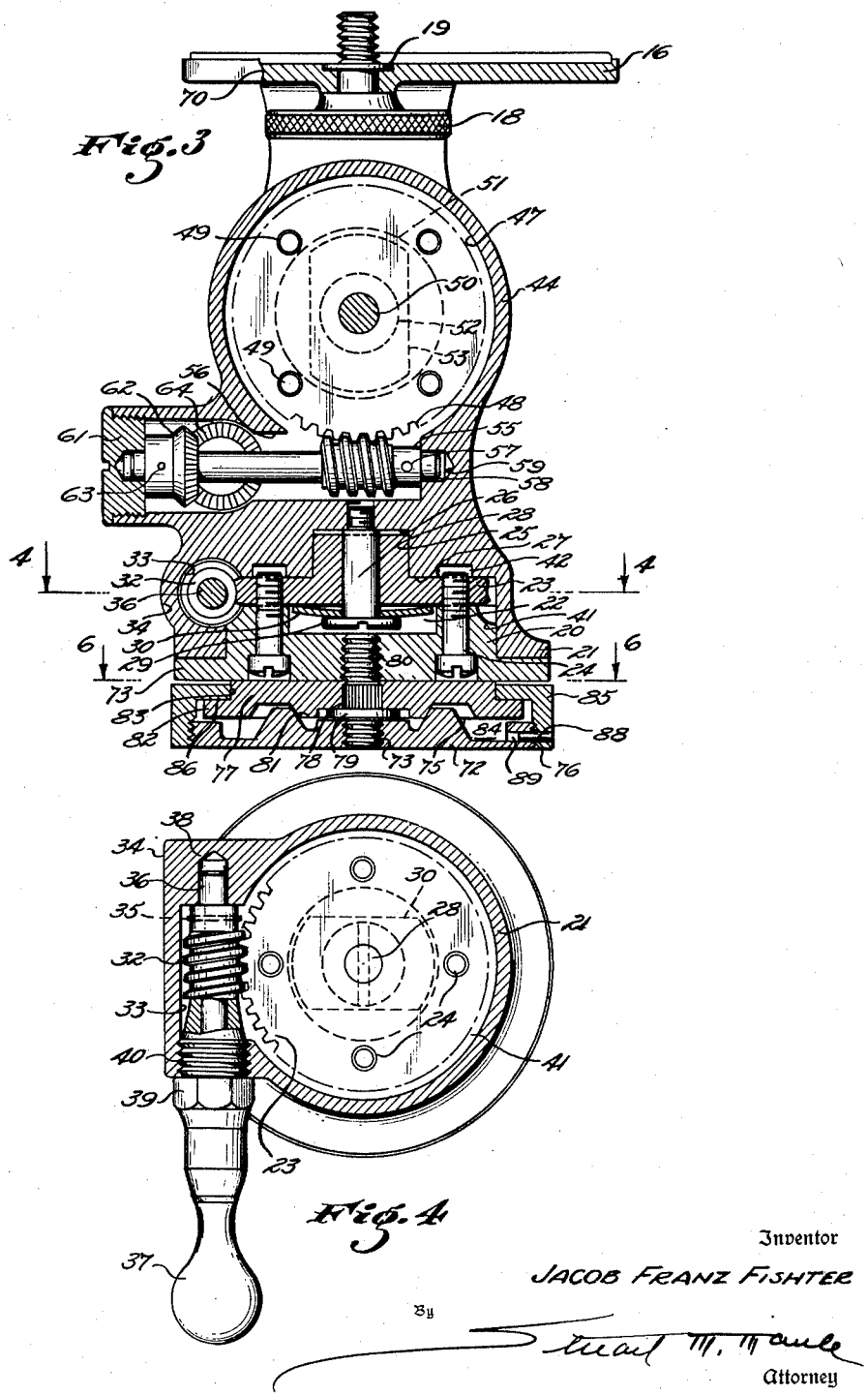
Inventor
JACOB FRANZ FISHTER
By Stuart M. Maule
Attorney Patented June 5, 1951

2,555,638

UNITED STATES PATENT OFFICE 2,555,638

TRIPOD HEAD

Jacob Franz Fishter, Los Angeles, Calif., assignor to Panogear Industries, Los Angeles, Calif., a corporation of California Application September 29, 1948, Serial No. 51,795

3 Claims. (Cl. 248—183)

This invention relates to instrument supports, and more particularly to adjustable heads for tripods and like structures applicable to the support of cameras, telescopes, surveyors' instruments, and similar apparatus.

In the operation of any of such instruments, and particularly in the operation of cameras, it is a convenience to the operator to be able to place his hands instinctively and automatically on the directional controls. When a photographer is following a moving object with his lens or taking a succession of still shots at different angles, and his hands must move between control mechanisms specific to the camera itself and manually operated mechanism controlling the direction of view, it is of great advantage that his attention should not be distracted from the object and from the camera controls by the necessity of ascertaining where the directional controls have wandered or where he left them after the last prior operation thereof. Military observers of moving targets are often subjected to the same sort of distraction, and surveyors are aware of how easily a painstaking set-up of an instrument may be set awry by fumbling for handles and knobs with which to change the angle of view or to lock the instrument in place.

An object of my present invention is to provide an instrument support in which the manual controls for directional changes rotate with the instrument so as to have always the same position relative to the horizontal line of sight of the instrument and therefore to have always the same position relative to an operator maintaining a position in line with the line of sight.

A further object of the invention is to provide an instrument support in which the manual controls for directional changes have always the same position relative to each other so that the operator, having knowledge of the position of one of the controls, is guided by habit to the others.

Another object of the invention is the provision of an instrument support in which the manual controls respective to horizontal and to vertical changes in the line of sight of the instrument are always diametrically opposed at 90° from the line of sight of the instrument so as to allow convenient use of both hands in their simultaneous operation.

A further object of the invention is the provision of an instrument support having a panoramic free action and a lock therefor, in which the manual control of the lock is always accessible at all points in the panoramic circle and therefore always accessible to either or both hands of the operator regardless of his position with respect to the line of sight.

Yet another object of the invention is to provide, for use with a tripod and a micrometer-action instrument support, a simple, rugged, and fast panoramic free-action mechanism, and lock therefor, which is detachable from both the tripod and the micrometer-action support so that the latter and the free-action mechanism and lock are usable either conjunctively or independently.

A still further object of the invention is the provision of an instrument support incorporating mechanism of micrometric accuracy for panoramic sweeping and for tilting, and self-locking when the manual controls therefor are released.

This invention possesses other objects and valuable features, some of which, with those enumerated, will be set forth in the following description of the preferred embodiment of my invention illustrated in the drawings accompanying and forming part of the specification. It is to be understood that I do not limit myself to the showing made by the said drawings and description, as I may adopt variations of the preferred embodiment within the scope of my invention as defined by the claims.

Referring to the drawings:

Figure 3 is a longitudinal vertical sectional view on an enlarged scale, the plane of section being indicated by the line 3—3 of Figure 1 and the direction of view by the arrows.

Figure 4 is a horizontal sectional view illustrative of the panoramic micrometer-action mechanism, the plane of section being indicated by the line 4—4 of Figure 3, and the direction of view by the arrows.

Figure 1:
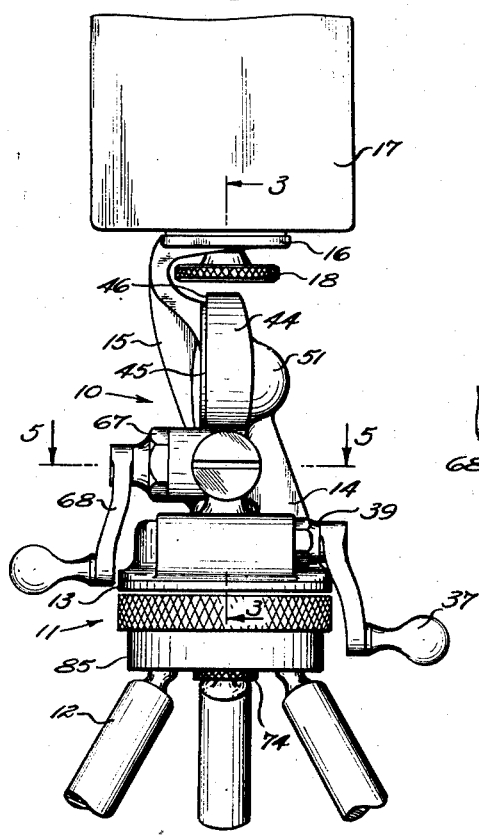
Figure 1 is an elevational view of an instrument support embodying the principles of the present invention.
Figure 5:
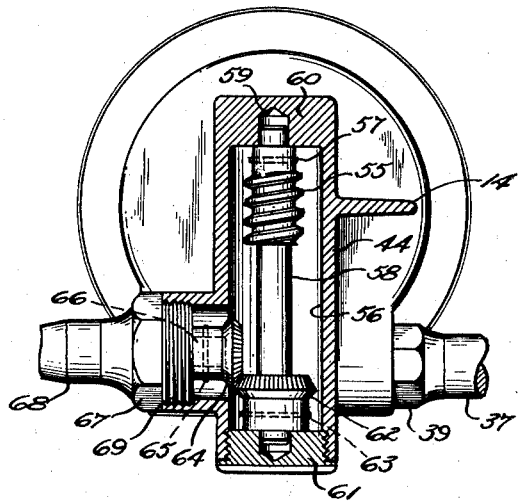
Figure 5 is a horizontal sectional view on the scale of Figures 3 and 4, showing the vertical angle or tilting micrometer action mechanism, the plane of section being indicated by the line 5—5 of Figure 1, and the direction of view by the arrows.
Figure 6:
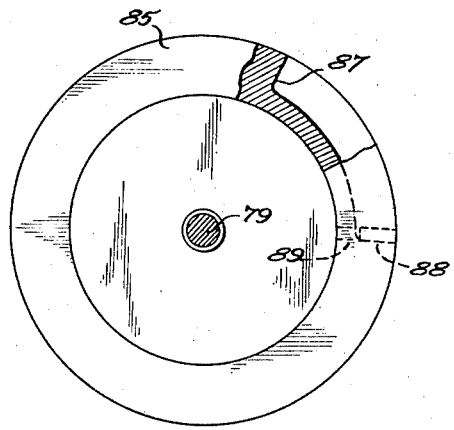
Figure 6 is a horizontal sectional view showing part of the panoramic free-action locking mechanism, the plane of section being indicated by the line 6—6 of Figure 3, and the direction of view by the arrows.
Figure 2:
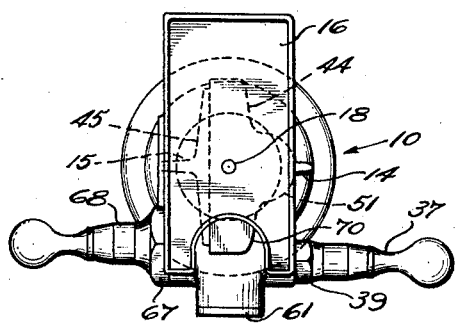
Figure 2 is a top plan view, the instrument and the tripod shown in Figure 1 being omitted.

Specifically describing that embodiment of my invention which has been chosen for illustration and description herein, and with particular reference to Figures 1 and 2, my instrument support comprises a micrometer-action housing 10 mounted upon a free-action locking mechanism 11, which in turn is supported by and secured to a tripod 12. The micrometer-action housing 10 includes three relatively movable parts, of which a base 13 is secured to the locking mechanism 11, a member 14 is journalled in the base 13 so as to be rotatable with respect thereto, and a second member 15 is journalled in the member 14 so as to be tiltable. The member 15 has a platform 16 to which an instrument, such as a camera, indicated conventionally at 17, may be secured by a bolt 18.

The bolt 18 passes freely through the platform 16 and is retained thereby by a washer 19, this method of attaching an instrument being conventional. The locking mechanism 11, base 13, and member 14 are concentric upon a common vertical axis, and the horizontal axis upon which the member 15 tilts passes through the common vertical axis. The line of sight of the instrument 17 may therefore be swung panoramically about the common vertical axis and may be tilted in a vertical plane passing through that axis.

As shown in Figures 3 and 4, the base 13 is provided with an upstanding annular flange 20 which fits loosely within a concentric annular flange 21 depending from the member 14 and forms therewith a chamber 22. A toothed wheel or gear 23 is held fixedly against the flange 20 within the chamber 22 by a plurality of bolts 24 extending through the flange 20, and has a hub 25 which fits loosely in a recess 26 in the lower face 27 of the member 14. The hub 25 is bored to receive a journal bolt 28 extending therethrough and threadedly engaging the member 14 and having a wide head 29. An arched resilient washer 30 is held by the head 29 against the gear 23 so as to be tensionable by the bolt 28 to provide a braking resistance to relative rotation of the gear 23 and the member 14. It will be apparent that the gear 23 is held by the plurality of bolts 24 as a fixedly associated element of the base 13, and forms a journal box for the journal bolt 28 whereby the member 14 is rotatably secured to the base 13, and that the bolt 28 not only serves as a journal pin but also serves to prevent upward displacement of the member 14 and as a brake tensioner.

To effect rotation of the member 14 relative to the base 13, a worm screw 32 is mounted in a pocket 33, formed tangentially to the chamber 22 in a boss 34 on the member 14, so that the worm screw constantly meshes with the gear 23. The worm screw 32 is secured by a pin 35 to a shaft 36 which extends outwardly from the pocket 33 and is provided at its outer end with a handle 37. The shaft 36 is journalled at its inner end in a bearing recess 38 formed in the boss 34, and is journalled adjacent to its outer end in a nut 39 engaged in a threaded bore 40 communicating with the pocket 33. The worm screw 32 and shaft 36 may be withdrawn from the pocket 33 by simply retracting the nut 39 from the bore 40, either with or without simultaneous rotation of the shaft by the handle 37, as the force applied through the threads of the nut will cause the member 14 to rotate to permit the worm screw to be withdrawn tangentially from its meshing engagement with the gear 23. In like manner, the worm screw and gear may be re-assembled by inserting the screw and shaft through the bore 40 and tightening the nut 39 while permitting either the handle 37 or the member 14 to rotate.

As the worm screw 32 is journalled in the member 14, and the gear 23 is fixedly held to the base 13, rotation of the handle 37 causes the worm screw to travel around the gear 23, thereby rotating the member 14 upon the base 13, and of course causing the handle 37 to travel with it. To permit the worm screw to travel a full circle around the gear 23, the upper outer margin of the flange 20 is bevelled to form an annular channel 41 through which the worm gear may move. An annular groove 42 is formed in the lower face of the member 14 corresponding to the bolt circle of the bolts 24 so that relative movement of the member 14 and base 13 is not obstructed by the ends of the bolts.

The upper portion of the member 14 has a disk-shaped housing 44 rising diametrically therefrom at a right angle to the pocket 33, and having its open side vertical and opposite to the direction of extension of the handle 37. The member 15 has a disk-shaped portion 45 which fits loosely and rotatably within the rim 46 of the housing 44, and forms with the housing a circular chamber 47. A toothed wheel or gear 48 is held fixedly against the disk 45 within the chamber 47 by a plurality of bolts 49. The gear 48 is bored to receive axially a journal bolt 50 extending therethrough and threadedly engaged in a boss 51 on the closed side of the housing 44 and having a wide head 52. An arched resilient washer 53 is held by the head 52 against the gear 48 and is tensionable by the bolt 50 to act as a brake upon movement of the gear 48 around the bolt 50.

Manifestly, the aforesaid arrangement of parts is similar to the arrangement described hereinbefore as rotatably connecting the base 13 and member 14, and permits rotation of the gear 48, and thereby tilting of the member 15 secured thereto, in a vertical plane around the bolt 50 as an axis. The bolt 50 is disposed on the vertical axis of the instrument support—that is, directly above the journal bolt 28—and parallel to the shaft 36 whereby the member 14 is rotated; and consequently the plane of tilting of the member 15 may be swung through a full circle by rotation of the member 14 but will always be at a right angle to the shaft 36 and the handle 37 extending therefrom.

Tilting of the member 15 is effected in a manner similar to the rotation of the member 14, by a worm screw 55 mounted in a pocket 56 tangential to the chamber 47 so that the worm screw constantly meshes with the gear 48. The worm screw 55 is secured by a pin 57 to a shaft 58 which is journalled at one end in a bearing recess 59 in the end wall 60 of the pocket 56 and at its other end in a screw plug 61. Adjacent to the screw plug 61, the shaft 58 carries a miter gear 62 secured thereto by a pin 63. A second miter gear 64 meshing with the miter gear 62 is affixed by a pin 65 to a drive shaft 66, providing a drive for the worm screw 55 at a right angle thereto and thereby at a right angle to the plane of tilting of the member 15. The drive shaft 66 is therefore parallel to the shaft 36, and extends outwardly oppositely thereto through a nut 67 in which it is journalled. A handle 68 is provided on the outer end of the shaft 66. The nut 67 engages a threaded opening 69 communicating with the pocket 56 and may be removed therefrom to permit removal of the handle 68, shaft 66 and miter gear 64 from the assembly. The shaft 58 and worm screw 55 may be removed from the pocket 56 by removal of the screw plug 61, and appropriate tilting of the member 15 to cause the worm screw to unmesh from the gear 48.

The worm screw 55 does not travel around the gear 48 when the handle 68 is operated, but the gear 48 then rotates, causing the member 15 to tilt. The line of sight of the instrument 17 may therefore be tilted through a vertical arc of approximately 180°—that is, from vertically downward to vertically upward—the limits of movement being imposed by contact of the platform 16 with the rotatable member 14. The platform 16 may be provided with an end notch 70 to prevent premature contact with the portion of the member 14 housing the screw plug 61.

A rapid panoramic movement is permitted by the free-action locking mechanism 11, which will now be described. A lower plate 72 has a central threaded bore 73 to receive a bolt 74 (see Figure 1) for attachment in the conventional manner to the tripod 12. The upper surface of the lower plate 72 is provided with an annular wedge-shaped ridge 75, and the periphery of the plate is provided with threads 76. An upper plate 77 has a smooth central bore 78 to receive a bolt 79 which, by engagement with a threaded axial recess 80 in the base 13, may clamp the base and upper plate to secure unified movement thereof. The lower surface of the upper plate 77 is provided with an annular wedge-shaped ridge 81 concentric with the ridge 75 and adapted to wedge thereagainst when the upper and lower plates are pressed together so as to render the upper plate immobile with respect to the lower plate. A flange 82 projects radially from the upper plate 77, leaving an annular shoulder 83 between the flange and the upper surface of the plate. The height and wedge-angles of the ridges 75 and 81 are such that when the ridges are clamped together, an annular space 84 will remain between the plates, external to the ridges.

A locking ring 85 is threaded internally adjacent its lower margin so as to engage the threads 76 of the lower plate 72, and has an inwardly turned flange 86 at its upper margin overlying the flange 82 of the upper plate 77. The shoulder 83 of the upper plate 77 has a little more height than the flange 86, permitting some vertical movement to the locking ring when the upper plate is clamped to the base 13. A radial and horizontal slot 87 in the periphery of the lower plate 72 extends partly thereabouts, and a pin 88 set radially in the locking ring 85 extends inwardly into the slot so as to be engageable by the ends thereof to limit rotation of the ring with respect to the lower plate. The slot 87 need be only of short length, permitting, say, one-sixth turn of the locking ring 85 relative to the lower plate 72, as such an extent of movement is sufficient to break the wedging contact of the two plates, and the purpose of the pin and slot is to prevent unintentional disassembly of the locking mechanism.

In the initial assembly of the above-described locking mechanism, the lower plate 72, upper plate 77, and locking ring 85 are assembled in locked position, and a hole 89 is drilled in the locking ring 85 to receive the pin 88 in suitable relation to the slot 87. When the pin 88 is then inserted in the hole 89, the parts are held together, but loosely. To later disassemble the locking mechanism, the pin 88 may be tapped out of the hole 89 into the annular space 84 between the plates.

It will be apparent that in the operation of the invention the member 14 can be rotated throughout 360° of panoramic sighting by manipulation of the handle 37, such motion or "panning" being relatively slow but being free of back-lash because of the worm-screw drive, and being locked when the handle is released both by the high resistance of a worm-screw to being turned by its driven gear and by the friction of the washer 30.

It will also be understod that the leverage afforded by the worm-screw drive is sufficient to overcome the friction of the washer 30 and to permit easy rotation of the member 14 without requiring mechanical unlocking devices. Similarly, the member 15 may be tilted from a horizontal position through an angle of 90° in one direction or the other, and will remain in the selected position when the handle 68 is released, its type of drive and its locking mechanism being the same as that of the member 14.

At all times during such operation, the handles 37 and 68 are convenient to the hands of the operator, being always at right angles to the panoramic line of sight. The operator may remove his hands from either or both of the handles to attend to other matters and return his hands to the handles with perfect facility because both handles will be at known and convenient positions. The operator will normally step around the tripod or stand of the instrument to keep in line with the line of sight and thus keep the handles respectively at his right and left hands. He will never "pan" the instrument and then have to fumble for the tilting handle 68, because he knows that the relative position of that handle is unchanged and the handle is where he habitually reaches for it.

It will be further manifest that when the locking mechanism 11 is utilized to give a quick "panning" movement, the control for it is equally accessible to the operator, as the ring 85 presents a surface which may be gripped from all directions. The operator may grasp the ring 85 with either hand and from any position to unlock or to lock the mechanism 11, and can hold and direct the upper rotatable part of the instrument support with one hand while manipulating the ring 85 with the other hand as may be convenient. For work with some types of instrument, the mechanism 11 may be unnecessary, in which event it may be removed entirely, as the bore 73 in the lower plate 72 and the recess 80 in the base 13 have the same diameter and thread pitch and the base may consequently be secured directly to the tripod 12 by the bolt 74.

I claim:

1. In a device for supporting an instrument upon a stand, the combination of a gear-driven head arranged to panoramically and vertically alter the line of sight of said instrument and having operating handles arranged to rotate with said head about the vertical axis thereof so as to maintain fixed horizontal angularity with said line of sight, a base in which said head is journalled for slow-motion panoramic movement when said head is gear driven, and a locking mechanism connecting said base to said stand and releasable to permit rapid panoramic movement of said base and said head, said locking mechanism comprising a lower plate, means for securing said lower plate rigidly to said stand, an upper plate, means for securing said upper plate rigidly to said base, said plates having concentric annular surfaces confronting each other and adapted to be brought into contact with each other to produce frictional interengagement between said plates, a locking ring threadedly engaging the periphery of one of said plates, and an inwardly turned flange on said locking ring embracing the periphery of and engaging a face of the other of said plates whereby said plates are drawn toward each other when said ring is threadedly advanced upon the first-mentioned of said plates.

2. In a device for supporting an instrument upon a stand, including a base upon which said instrument is rotatable, a locking mechanism connecting said base to said stand and releasable to permit rapid panoramic movement of said base and said instrument comprising a lower plate non-rotatably secured to said stand, an upper plate secured to said base, said plates having concentric annular wedge-shaped ridges upon their confronting surfaces adapted to be brought into contact to produce frictional engagement of said plates, a locking ring threadedly engaging the periphery of said lower plate and having an inwardly turned flange overlying the periphery of said upper plate so as to clamp said upper plate to said lower plate when said ring is threadedly advanced upon said lower plate and to release said upper plate for free rotational movement when said ring is threadedly retracted, said lower plate having a slot in its peripheral margin extending partly thereabout, and a pin carried by said ring engageable with said slot to limit rotation of said ring to less than one full turn, whereby said ring is prevented from disengaging from said lower plate.

3. In a device for supporting an instrument upon a stand, a base, a locking mechanism connecting said base to said stand and releasable to permit free rotary movement of said base and instrument with respect to said stand, said locking mechanism comprising a lower plate, means for securing said lower plate rigidly to said stand, an upper plate, means for securing said upper plate rigidly to said base, said plates having concentric annular surfaces confronting each other and adapted to be brought into contact with each other to produce frictional interengagement between said plates, a locking ring threadedly engaging the periphery of one of said plates, and an inwardly turned flange on said locking ring embracing the periphery of and engaging a face of the other of said plates whereby said plates are drawn toward each other when said ring is threadedly advanced upon the first-mentioned of said plates.

JACOB FRANZ FISHTER.

REFERENCES CITED

The following references are of record in the file of this patent:

UNITED STATES PATENTS

| Number | Name | Date |
|---|---|---|
| 1,219,304 | Hanks | Mar. 13, 1917 |
| 1,425,807 | Thalhammer | Aug. 15, 1922 |